United States Patent
Meyer et al.

(10) Patent No.: US 6,203,124 B1
(45) Date of Patent: Mar. 20, 2001

(54) CRAWLER UNDERCARRIAGE

(75) Inventors: Joachim Meyer, Langenfeld; Andreas Schramm, Hilden, both of (DE)

(73) Assignee: Komatsu Mining Germany GmbH, Dësseldorf (DE)

( * ) Notice: Subject to any disclaimer, the term of this patent is extended or adjusted under 35 U.S.C. 154(b) by 0 days.

(21) Appl. No.: 09/349,170

(22) Filed: Jul. 9, 1999

(30) Foreign Application Priority Data

Jul. 10, 1998 (DE) .............................. 198 32 637

(51) Int. Cl.$^7$ .................................. B62D 55/14
(52) U.S. Cl. ........................ 305/136; 305/139; 305/142
(58) Field of Search ..................... 305/124, 136, 305/139, 142, 195, 199

(56) References Cited

U.S. PATENT DOCUMENTS

| | | | | |
|---|---|---|---|---|
| 2,466,068 | * | 4/1949 | Archer | 305/139 X |
| 2,827,337 | * | 3/1958 | Buffum | 305/139 X |
| 3,472,563 | * | 10/1969 | Irgens | 305/195 X |
| 5,899,164 | * | 5/1999 | Coast | 305/139 X |

FOREIGN PATENT DOCUMENTS

| | | | | |
|---|---|---|---|---|
| 2031824 | * | 4/1980 | (GB) | 305/142 |
| 55-94866 | * | 7/1980 | (JP) | 305/199 |
| 61-188282 | * | 8/1986 | (JP) | 305/142 |
| 62-122868 | * | 6/1987 | (JP) | 305/199 |

* cited by examiner

*Primary Examiner*—Russell D. Stormer
(74) *Attorney, Agent, or Firm*—Cohen, Pontani, Lieberman & Pavane

(57) ABSTRACT

An undercarriage for a construction machine having a support frame and at least one carrier roller positioned on an upper surface of the support frame for providing upper guidance to the chain or band. The carrier roller is constructed from two bearing pins coaxially arrange on opposite sides of the roller, and includes a plurality of axially parallel driving pins arrange equidistantly along a coaxial circumferential circle on one side face of the roller. The driving cams on the chain engage between two adjacent driving pins thereby eliminating relative movement between the chain or band and the carrier roller.

7 Claims, 4 Drawing Sheets

CRAWLER UNDERCARRIAGE

BACKGROUND OF THE INVENTION

1. Field of the Invention

The invention relates construction machines, and more particularly; to a crawler undercarriage for a construction machine.

2. Description of the Related Art

Such crawler undercarriages generally have two undercarriage halves connected to one another via a frame. One undercarriage half essentially comprises a closed chain with base plates, which runs over a tumbler and idler wheel by means of an interposed supporting frame with a chain tensioning device and, for lower guidance, has track rollers along the supporting frame and, for upper guidance, has carrier rollers.

A carrier roller generally comprises a wheel body portion on the two side faces of which bearing pins are coaxially arranged. The carrier roller is mounted in a rotating manner on the upper part of the supporting frame by means of the bearing pins and corresponding bearings. The carrier roller prevents the chain from rubbing against the supporting frame. The chain rests on the carrier roller and, for guidance, has driving cams, which are shaped in such a way that the wheel body portion of the carrier roller engages in a groove-like portion of the driving cams of the chain. Consequently, an unfavorable movement of the chain transversely with respect to the running direction is avoided. There is frictional engagement between the chain and the carrier roller. Particularly under extreme environmental influences, such as in opencast operation for example, disturbances of the frictional engagement may occur, with the result that it is possible for the carrier roller to come to a standstill. This has the consequence of considerable wear on the carrier roller and on the chain, with the result that the service life of the two components is reduced.

DE 296 16 953 U1 discloses a carrier roller which interacts in a positively engaging manner with a chain in order to avoid the carrier roller coming to a standstill during operation. For this purpose, the carrier roller has cam-like projections on its outer circumference, which engage in recesses present between individual chains links. This type of design does indeed prevent the carrier roller from coming to a standstill on account of the positive engagement; since, however, a relative movement of the two engaged components can take place in the case of the previously known solution on account of the engagement geometry of the carrier roller and chain, here too there is a tendency toward wear. Furthermore, the carrier roller is a quite complex structural design, in particular because of the radially outer cam-like projections, which are fastened on the carrier roller by bolting or by clamping.

SUMMARY OF THE INVENTION

It is therefore an object of the present invention to provide a carrier roller of a simple construction in which relative movements between the carrier roller and chain or band are entirely avoided.

This and other objects are in accordance with an embodiment of the invention wherein the carrier roller has a plurality of axially parallel driving pins arranged equidistantly on a coaxial circumferential circle of at least one side face of the wheel body portion. One driving lug of the chain or the band respectively engages between two neighboring driving pins of the carrier roller. In this case, the driving pins may be provided on one or both side faces of the carrier roller.

The engagement with minimal backlash brought about in this way has the effect that relative movements between the chain or band and carrier roller are entirely avoided during forward or reverse travel. The accompanying minimization of wear leads to a considerable increase in the service life of the highly stressed chains or bands, in particular under extreme environmental and material influences. The simple solution ensures a constant rotational movement of the carrier roller and it is possible for conventional carrier rollers to be retrofitted with the solution according to the invention.

According to a further embodiment of the invention, the two surfaces of the driving lugs coming into contact with the driving pins run beveled, i.e. conically with respect to one another. In this way, even if there is continued wearing of the driving lugs, engagement of the chain and carrier roller without backlash is made possible.

The driving pins arranged on one or both sides of the side faces of the wheel body portion may be integrally formed on the wheel body and thereby form an integral cast component. Alternatively, it is also possible to weld or bolt separate carrying pins onto the side faces. The two last-mentioned alternative forms of securement are particularly suitable for retrofitting conventional carrier rollers.

To improve the running properties between the carrier roller and chain, the driving pins may have a round or involute-shaped cross section.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Further measures improving the invention are presented in more detail below together with the description of a preferred embodiment of the invention on the basis of the figures, in which.

DETAILED DESCRIPTION OF THE PRESENTLY PREFERRED EMBODIMENTS

Figure 1:
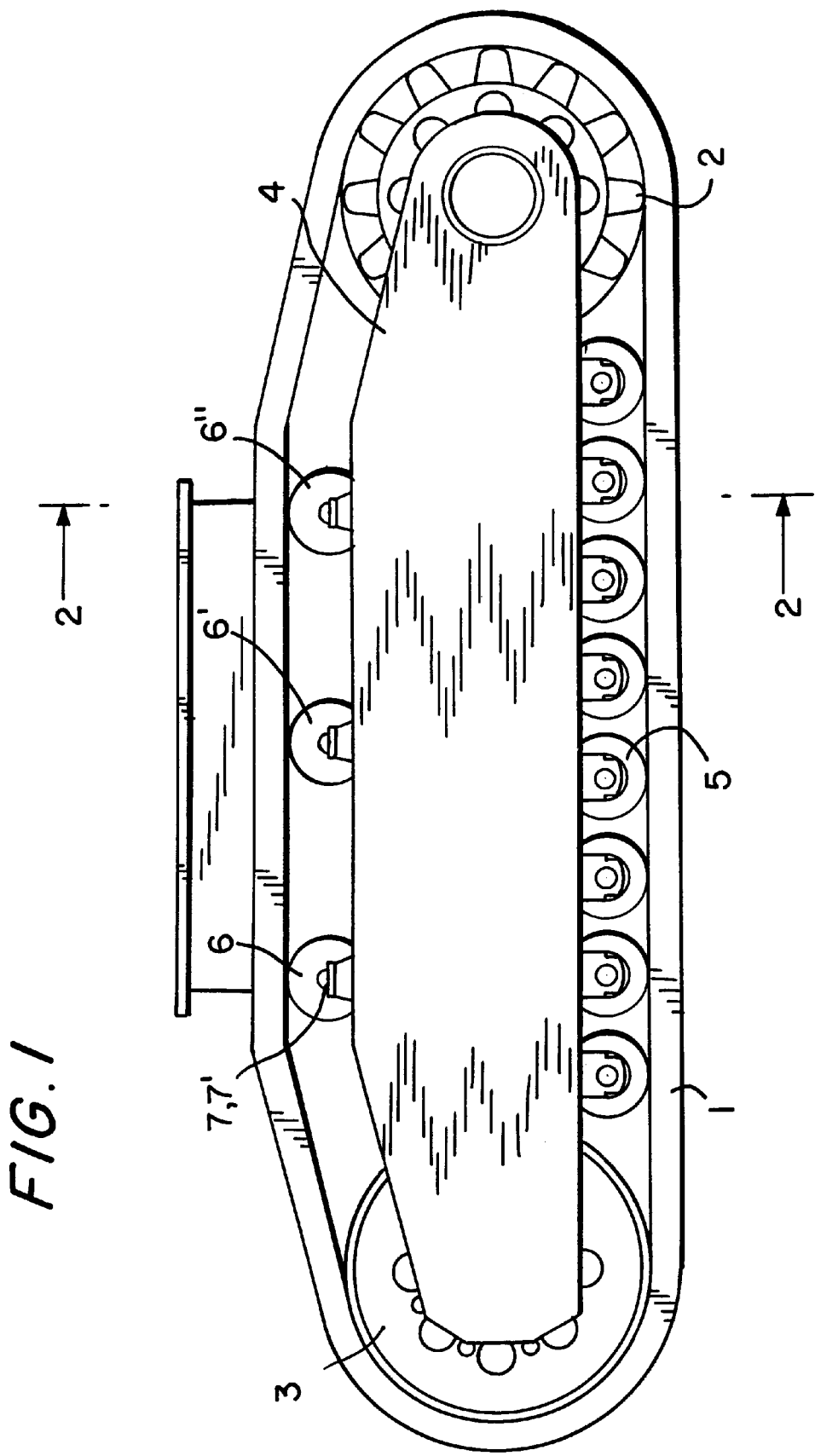
FIG. 1 is a side view of a crawler undercarriage with two carrier rollers.

The vehicle half of a crawler undercarriage according to FIG. 1 essentially comprises a chain 1, which runs over a tumbler 2 and an idler wheel 3. A plurality of track rollers 5 provided under the supporting frame 4. The guidance of the chain 1 above the supporting frame 4 guide the chain 1 and support it underneath is undertaken by three carrier rollers 6, 6', 6". The carrier rollers 6, 6', 6" are mounted in a rotating manner on supporting frame 4 by means of bearing pins 7, 7'.

Figure 2:
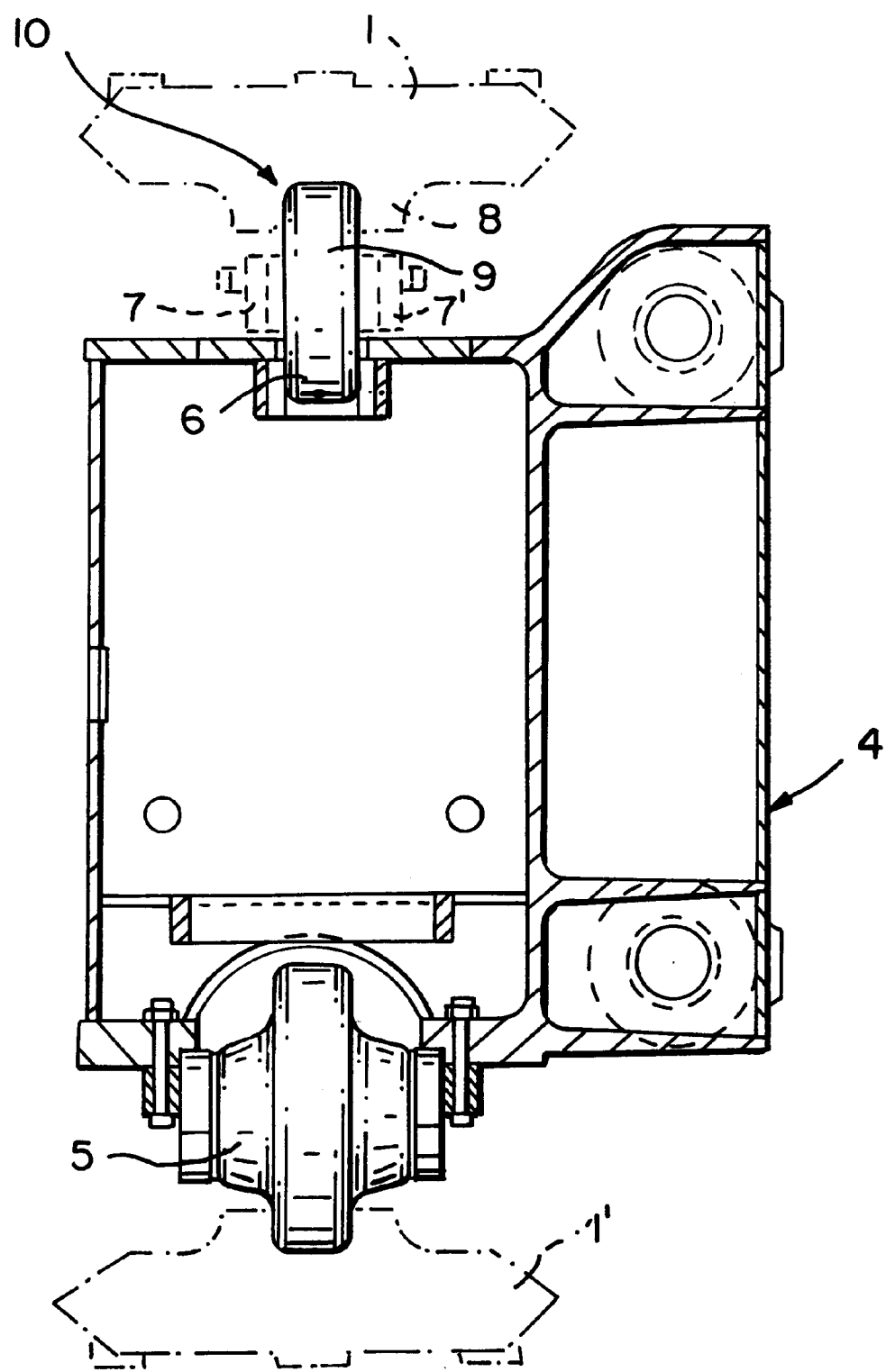
FIG. 2 is a cross sectional view of the crawler undercarriage taken along line A—A of FIG. 1.
Figure 4:
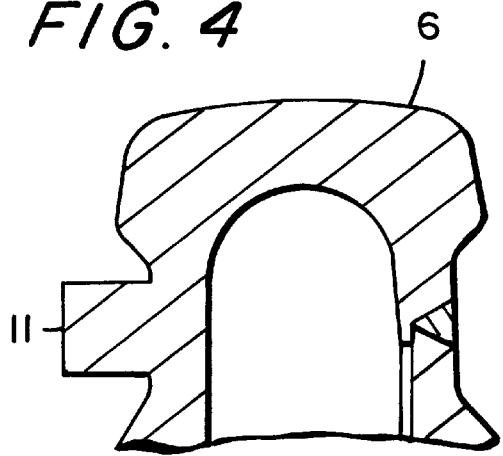
FIG. 4 shows a partial cross section of the roller.
Figure 5:
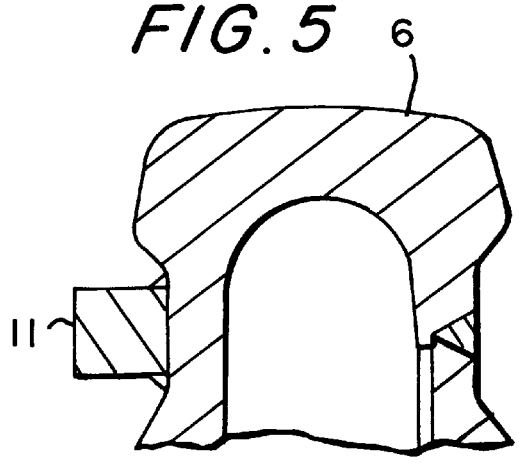
FIG. 5 is a view as in FIG. 4 of another embodiment.
Figure 6:
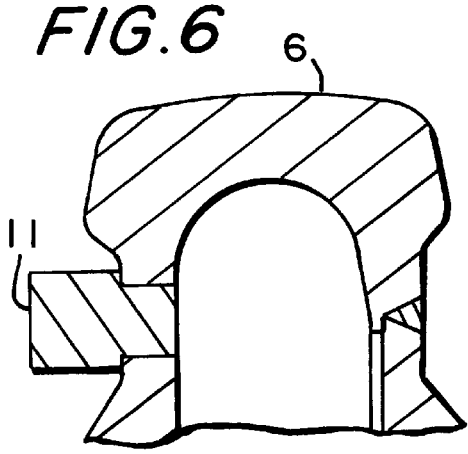
FIG. 6 is a view as in FIG. 4 of still another embodiment.

As shown in FIG. 2, the carrier roller 6 runs with its wheel body portion 9 in a groove-shaped recess within inwardly directed driving cams or lugs 8 of the chain 1. On a side face 10 of the wheel body portion 9, a plurality of driving pins 11 are provided, arranged equidistantly on a coaxial (concentric) circumferential circle. The driving pins 11 can be integral with the wheel body (FIG. 4) or welded (FIG. 5) or screwed (FIG. 6) to the roller 6.

Figure 3:
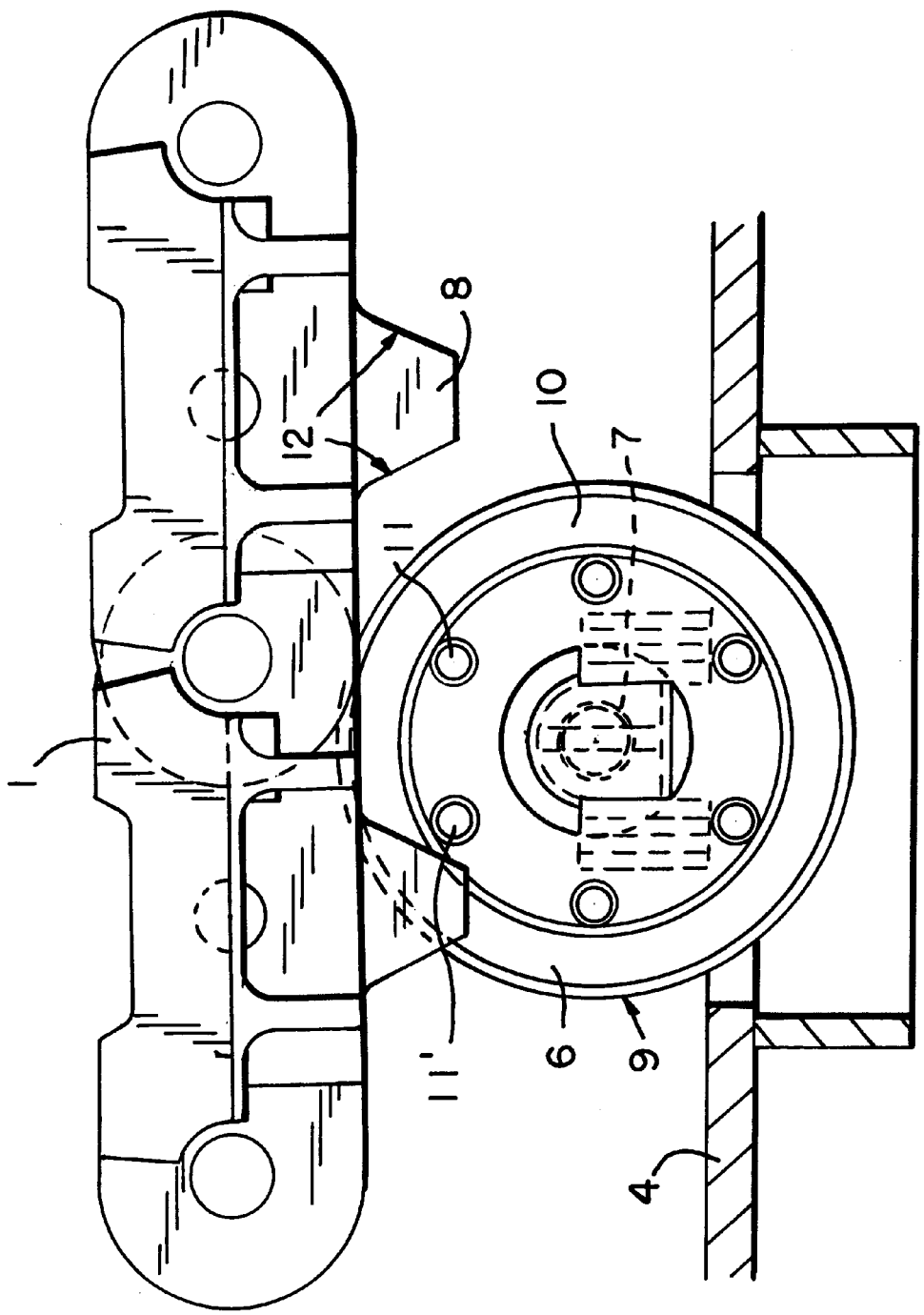
FIG. 3 shows an enlargement of a detail in the region of a carrier roller.
Figure 7:
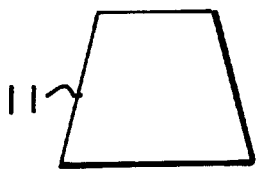
FIG. 7 is a cross section of a drawing pin.

According to FIG. 3, during operation of the crawler undercarriage one driving lug 8 of the chain 1 respectively engages between two neighboring driving pins 11, 11'. In order to ensure an interaction without backlash, the two surfaces 12, 12' coming into contact with the driving pins 11, 11' run beveled, (i.e. conically with respect to one another). The driving pins 11 have a round cross section in order to achieve operation with lowest possible friction. It is also possible for the driving pins to have an involute-shaped cross section (FIG. 7).

The invention is not restricted in its implementation to the preferred exemplary embodiment specified above. Rather, a number of variants which make use of the technical teaching presented are conceivable, even in configurations of a fundamentally different type.

The invention is not limited by the embodiments described above which are presented as examples only but can be modified in various ways within the scope of protection defined by the appended patent claims.

We claim:

1. A crawler undercarriage for a construction machine comprising:

a support frame (4) having opposing ends and an upper and lower surface;

at least one tumbler (2) disposed at one end of said support frame and having an assigned idler wheel (3) disposed at an opposing end of said tumbler (2);

a chain (1) running over said at least one tumbler (2) and having a plurality of driving lugs (8);

a plurality of track rollers (5) arranged on the lower surface of said support frame for providing lower guidance to said chain (1);

at least one carrier roller (6) arranged on the upper surface of said support frame (4) for providing upper guidance to said chain (1), said at least one carrier roller (6) having opposing sides and including two bearing pins (7, 7') coaxially arranged on opposing side of said at least one carrier roller (6), said at least one carrier roller (6) having a wheel body portion (9) comprising at least one side face (10) and a plurality of axially parallel driving pins (11) arranged equidistantly on a coaxial circumferential circle of said at least one side face (10); wherein one of said driving lugs (8) respectively engage between two adjacent driving pins (11, 11') of said carrier roller (6).

2. The crawler undercarriage in accordance with claim 1, wherein each of said plurality of driving lugs (8) comprise opposing surfaces (12, 12') having beveled edges with respect to one another for contacting the two adjacent driving pins (11, 11'), and enabling interaction between said driving lugs (8) and said plurality of driving pins (11, 11') while minimizing backlash of said driving lugs during engagement with each two adjacent driving pins.

3. The crawler undercarriage in accordance with claim 1, wherein said driving pins (11, 11') are integrally formed onto said side face (10) of said carrier roller (6).

4. The crawler undercarriage in accordance with claim 1, wherein said driving pins (11, 11') are welded onto said side face (10) of said carrier roller.

5. The crawler undercarriage in accordance with claim 1, wherein said driving pins (11, 11') are screwed into said side face (10) of said carrier roller.

6. The crawler undercarriage in accordance with claim 1, wherein said driving pins (11) have a round cross-section.

7. The crawler undercarriage in accordance with claim 1, wherein said driving pins have an involute-shaped cross-section.

* * * * *